United States Patent
Lando

(10) Patent No.: US 7,227,338 B2
(45) Date of Patent: Jun. 5, 2007

(54) FIXED FREQUENCY ELECTRICAL GENERATION SYSTEM WITH INDUCTION COUPLER AND USE THEREOF IN AN AIRCRAFT

(75) Inventor: Jean-Louis Lando, Saverdun (FR)

(73) Assignee: Airbus France, Toulouse (FR)

( * ) Notice: Subject to any disclaimer, the term of this patent is extended or adjusted under 35 U.S.C. 154(b) by 23 days.

(21) Appl. No.: 11/344,204

(22) Filed: Feb. 1, 2006

(65) Prior Publication Data
US 2006/0192535 A1 Aug. 31, 2006

(30) Foreign Application Priority Data
Feb. 4, 2005 (FR) .................................. 05 50328

(51) Int. Cl.
*H20P 9/04* (2006.01)
(52) U.S. Cl. .............................. 322/14; 322/28; 322/30; 322/31; 322/51; 322/61
(58) Field of Classification Search ................... 322/14, 322/17, 28, 32, 30, 31, 51, 59, 61
See application file for complete search history.

(56) References Cited

U.S. PATENT DOCUMENTS

| | | | | |
|---|---|---|---|---|
| 3,476,999 A | * | 11/1969 | Agarwal | ..................... 318/146 |
| 4,378,583 A | * | 3/1983 | Caprari | ....................... 362/263 |
| 4,387,335 A | * | 6/1983 | Fisher et al. | .................. 322/32 |
| 4,510,433 A | * | 4/1985 | Gamze et al. | ................ 322/32 |
| 4,701,691 A | * | 10/1987 | Nickoladze | .................. 322/32 |
| 4,937,508 A | | 6/1990 | Rozman | |
| 5,418,446 A | * | 5/1995 | Hallidy | ........................ 322/28 |
| 2005/0180862 A1 | | 8/2005 | Lando | |

FOREIGN PATENT DOCUMENTS

DE 39 25 812 A1 3/1990
FR 2 107 573 5/1972

OTHER PUBLICATIONS

U.S. Appl. No. 11/344,204, filed Feb. 1, 2006, Lando.

* cited by examiner

Primary Examiner—Darren Schuberg
Assistant Examiner—Iraj A. Mohandesi
(74) Attorney, Agent, or Firm—Oblon, Spivak, McClelland, Maier & Neustadt, P.C.

(57) ABSTRACT

A fixed frequency electrical generation system includes an induction coupler. The system includes an electricity generator with no rings or brushes, and an induction speed regulator, mechanically coupled, so as to transform mechanical energy input from a shaft rotating at a variable speed into output electricity in the form of at least one alternating voltage with a constant rms value and constant frequency.

11 Claims, 2 Drawing Sheets

FIXED FREQUENCY ELECTRICAL GENERATION SYSTEM WITH INDUCTION COUPLER AND USE THEREOF IN AN AIRCRAFT

TECHNICAL DOMAIN

The invention relates to a fixed frequency electrical generation system with induction coupler and use thereof in an aircraft.

STATE OF PRIOR ART

The domain of the invention includes alternative principal and emergency electrical generation systems onboard aircraft. But it also includes generation of electricity from a mechanical source at variable speed.

Aircraft are frequently fitted with alternators that generate AC current at constant frequency.

One of the main advantages of AC current at constant frequency compared with variable frequency current is its simplicity of use for consumers. However, a more complicated technique is necessary to generate it. Obtaining a constant frequency obliges manufacturers to provide a constant speed of drive. The constant frequency usually used is 400 Hz.

FIG. 1 illustrates such an AC current generation at fixed frequency with:
between a motor 8 and a bus 9:
a constant speed drive block 4,
an alternator block 5,
a line relay 6,
and a regulation system 7 connected to each of these three elements 4, 5, 6 and to the input to the line relay 6.

Constant Speed Drive Block 4

In FIG. 1, the constant speed drive block 4 is separate from the alternator block 5. In fact, the assembly of these two elements forms a unit that is usually fixed close to the lower part of the motor 8 to which it is coupled.

This Constant Speed Drive (CSD) block 4 is a system in which the input shaft is driven at a speed that varies with the engine speed, and the output shaft rotates at a constant speed. Therefore this output shaft drives the alternator block 5 at constant speed and therefore at constant frequency since $f = p N$
where:
f=frequency,
p=number of pairs of poles in the alternator 5,
N=number of revs/second of the rotor in the alternator block 5.

A variation range of the input speed is usually fixed, within which a constant speed output is possible.

The constant speed drive block 4 comprises:
a cylinder block,
a hydraulic differential.

The cylinder block is composed of a pump and an axial piston engine placed end to end. The motor is provided with a fixed plate while the pump has a variable pitch plate. The speed of the motor shaft is varied and its direction of rotation is selected by regulating the pitch of the plate.

The hydraulic differential is composed of two planet gears and two satellite gears. The input shaft is the carrier of the planet gears and drives the hydraulic pump powering the motor in rotation. The motor rotates the speed adjustment satellite. The output satellite gear drives the alternator rotor.

When the speed of the input shaft varies, the variable pitch plate of the pump is positioned so as to vary the speed of the adjustment satellite gear. When the speed at the input is too low, revs are added. When the speed is too high, revs are subtracted by reversing the direction of rotation of the motor. When the input speed is exactly as required, the plate remains in the vertical position and the differential stops rotating.

Alternator Block 5

The alternator block 5 comprises three adjacent units:
a main alternator;
an exciter;
a Permanent Magnet Generator (PMG).

The PMG, the exciter and the alternator each has its own rotor. The three rotors are fixed to the same shaft and are therefore driven at the same speed.

The rotor of the PMG comprises permanent magnets. As soon as this rotor is driven in rotation, electricity can be collected at the terminals of the stator without providing any excitation. This rectified electrical current is sent through a regulation box to the exciter field coil stator. An AC current is then collected at the terminals of the exciter rotor, and this AC current is rectified by the diodes located in the common drive shaft (rotating diodes) to excite the alternator.

Regulator Device 7

This voltage regulator device 7 maintains a constant rms output voltage.

The alternator block 5 is overexcited when the voltage tends to reduce, or is underexcited when the voltage tends to increase. This is controlled by comparing the output voltage from the alternator block 5 with a reference voltage, the difference is amplified and a current proportional to the difference modifies the excitation and the electromotive force of the alternator.

Different systems according to prior art can be used to generate current at constant frequency. These systems have many disadvantages:

The Integrated Drive Generator (IDG) made by the Hamilton-Sundstrand company consists of integrating a Constant Speed Drive (CSD) and a three-stage three-phase alternator in the same casing. The CSD regulates the mechanical speed for the alternator drive so as to generate a fixed frequency of 400 Hz. The rms value of the output voltage is regulated to 115 V. This generator has many disadvantages: high purchase price, high maintenance cost, essential oil quality, high mass, low efficiency, mediocre reliability and difficult to maintain due to its complexity, performances dependent on the state of wear of the CSD, large exchanger (impact on motor), supplier monopoly.

The Variable Speed Constant Frequency (VSCF) generator made by the Hamilton-Sundstrand company consists of a combination of a Variable Frequency Generator (VFG) and a static electricity converter of the variable frequency/fixed frequency type. This system often requires the creation of two electrical networks: one at a fixed frequency and one at a variable frequency, so as to keep masses and reliabilities reasonable. This generator has many disadvantages: high purchase price, high mass due to the presence of a very powerful static converter and power supply lines sized for 800 Hz, mediocre efficiency at fixed frequency, low reliability due to the static converter and inversely proportional to the power, low power at fixed frequency.

PRESENTATION OF THE INVENTION

The purpose of the invention is a power supply for any electrical load in the form of three-phase voltages with a constant rms value and a constant frequency regardless of the engine speed between limiting speeds which for an aircraft are the Ground Idle speed and the take-off speed, with better reliability than is possible with systems according to known art.

Another purpose of the invention is to enable use as a motor to start the engine to which it is mechanically coupled.

The invention discloses a fixed frequency electrical generation system with an induction coupler, characterized in that it comprises:

- an electricity generator with no rings or brushes that comprises:
- a primary stage that supplies electricity so that the system can be independent,
- a secondary excitation stage used to control magnetization of the tertiary stage,
- this tertiary stage that is the electricity generation power stage,
- these three stages having their rotors fixed to a second mobile shaft,
- an induction speed regulator, that comprises:
- an exciter stage used to control magnetization of an induction speed regulator stage,
- this regulator stage outputting a fixed and regulated mechanical speed from a variable mechanical speed,
- mechanically coupled through two gears, so as to transform mechanical energy input from a first shaft rotating at a variable speed into output electricity in the form of at least one alternating voltage with a constant rms value and constant frequency.

Advantageously, the exciter stage is composed of a stator powered by a DC source, for which the intensity can be regulated and a rotor running at a mechanical input speed and provided with a three-phase armature.

Advantageously, the induction speed regulator stage is composed of a rotor mechanically fixed to the previous rotor, provided with a single-phase winding and a short circuit cage for which the angular rotation speed is to be regulated.

Advantageously, the rotors of the excitation stage and the induction speed regulator stage are fixed to the first shaft.

Advantageously, the cage is free to move concentrically with the first shaft.

Advantageously, the cage is fixed to a gear that meshes with a gear fixed to the rotor of the electricity generator.

Advantageously, the three-phase armature of the exciter stage rotor is connected to the single-phase armature of the regulator stage rotor through a rectifier.

Advantageously, the intensity of the current passing through the stator in the exciter stage is controlled using a low power voltage switching power supply.

The system according to the invention has the following advantageous characteristics:

- simplicity and reliability (no constant speed drive),
- little wear (practically contact-free),
- operation possible as starter using two low power power inverters,
- lower cost,
- open to competition.

The system according to the invention may be used on an aircraft as a main generator or as an emergency generator:

Main Generator

If the system according to the invention is used as a main generator, it is coupled to the accessory gearbox and is driven mechanically. It is used to power all onboard AC electrical loads. During normal operation, it behaves like a synchronous generator (three-phase alternator).

Since it is reversible, it can be used as a motor to start the aircraft engine. In order to obtain operation in <<starter>> mode, the stator of the electricity generator must be powered in three-phase from the AC network and it must be excited in a controlled manner by measuring the frequency of the permanent magnet generator.

Emergency Generator

If the system according to the invention is used as an emergency generator, it is coupled to a wind generator (variable pitch propeller). If the main generators are lost, this assembly is deployed outside the aircraft and is driven in rotation by the air speed. The system according to the invention then makes aircraft essential systems available.

DETAILED PRESENTATION OF PARTICULAR EMBODIMENTS

The fixed frequency electricity generation system according to the invention is an electromechanical converter that powers any electrical load with energy in the form of three-phase voltages with constant rms and frequency values, starting from a variable speed mechanical source.

Figure 1:
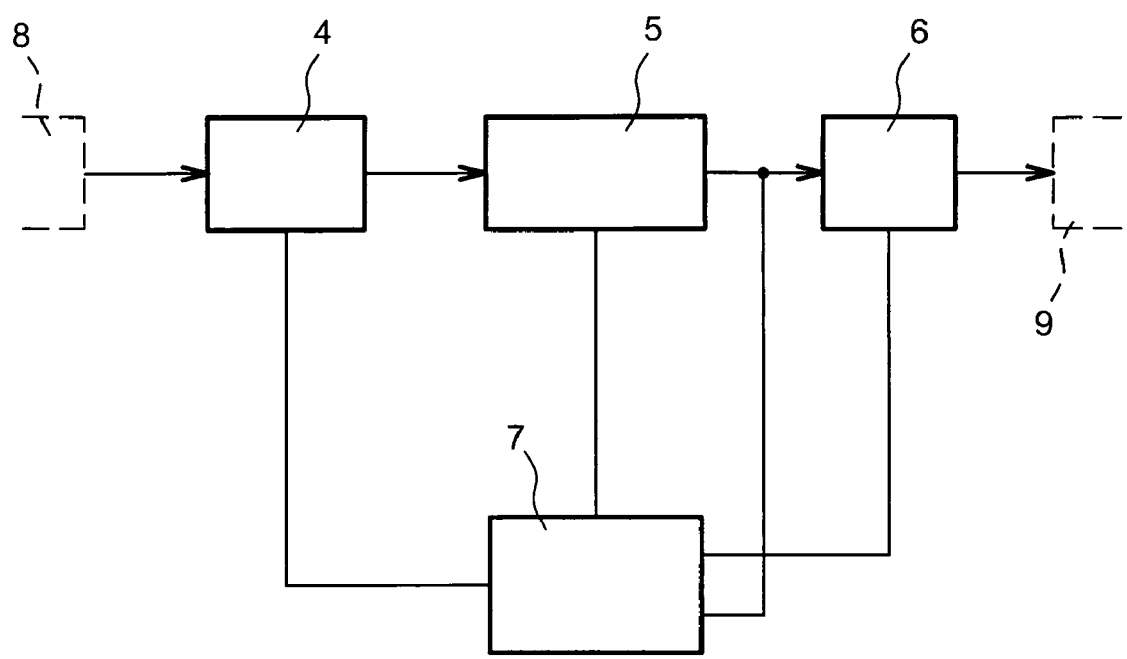
FIG. 1 illustrates an AC generator according to prior art.
Figure 2:
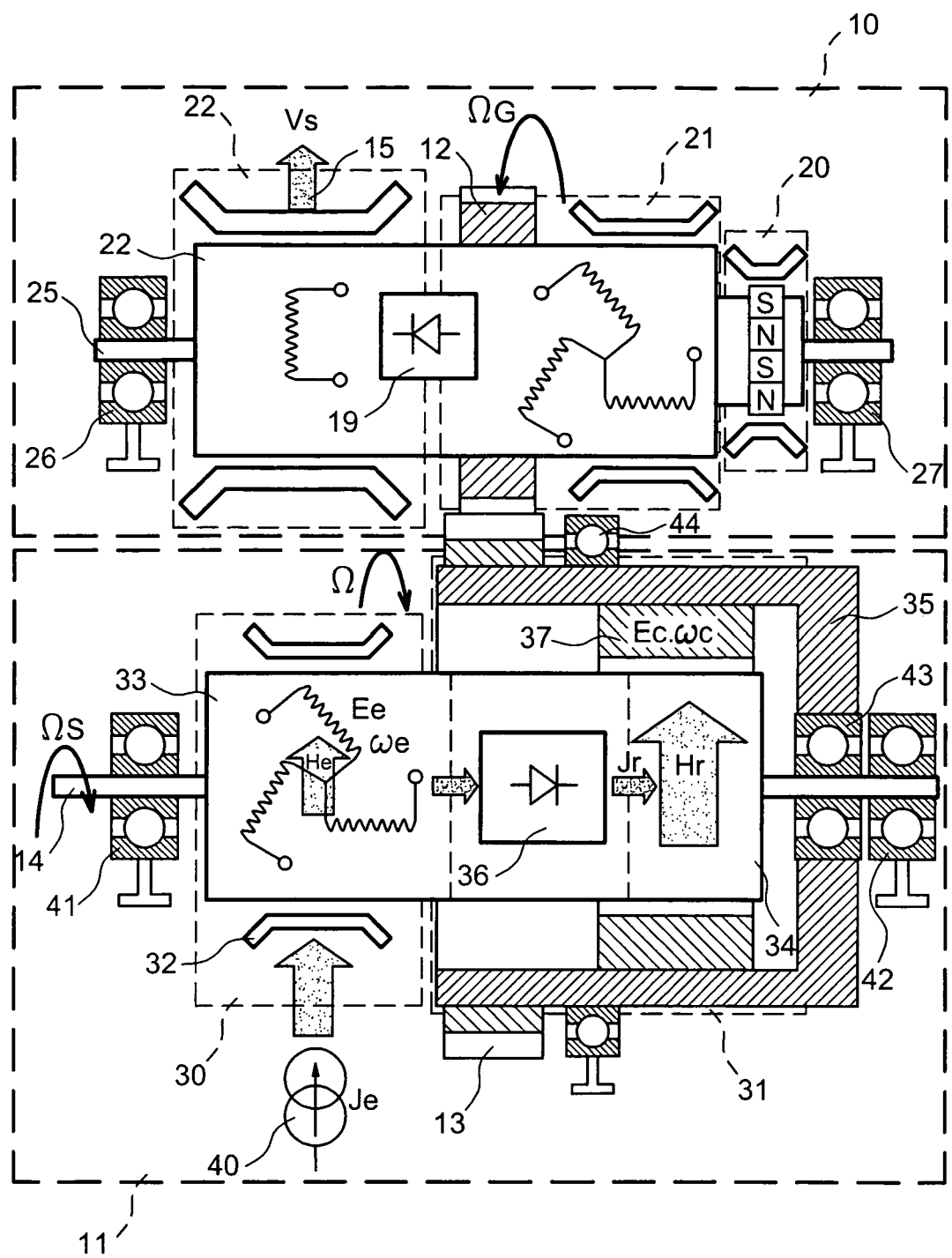
FIG. 2 illustrates the fixed frequency electrical generation system with an induction coupler according to the invention, used as a generator.

The system according to the invention as illustrated in FIG. 2, comprises:

- an electricity generator or alternator 10 with no rings or brushes,
- an induction speed regulator 11, mechanically coupled through two gears 12 and 13 so as to transform mechanical energy input from a first shaft 14 rotating at variable speed, into output electricity in the form of at least one single-phase and multi-phase alternating voltage 15 with a constant rms value and frequency.

The electricity generator 10 is based on a rotor/stator system with three stages:

- a primary stage 20 called the Permanent Magnets Generator outputting electricity such that the generator becomes standalone,
- a secondary stage 21 called the exciter, used to control magnetization of the tertiary stage,
- this tertiary stage 22 called the Main Generator that is the electricity generation power stage connected to the secondary stage through a rectifier 19.

The rotors of these three stages 20, 21 and 22 are fixed to a second shaft 25 free to move between two ball bearings 26 and 27.

This three-stage generator is well known to those skilled in the art and its advantage is that it eliminates ring or brush type connections so as to increase their reliability and to obtain a generator adapted to the high angular rotation speeds.

The induction speed regulator 11 is based on a two-stage system:

an exciter stage 30 (or inverted alternator) controlling magnetization of an induction speed regulator stage 31, this regulator stage 31 that outputs a fixed and regulated mechanical speed from a variable mechanical speed.

It is assumed that the windings are two-pole and single- or three-phase, in order to simplify the presentation. The operating principle would be similar in the general case of multi-pole and multiphase windings.

The exciter stage 30 consists of a stator 32 (auxiliary field coil) powered by a DC current output by a source 40 for which the intensity can be regulated, and a rotor 33 rotating at the input mechanical speed and provided with a three-phase armature.

The induction speed regulator stage 31 is composed of a rotor 34 mechanically fixed to the previous rotor 33 provided with a single-phase winding (main field coil), and a short circuited cage 35 (armature or rotating stator 37), for which the angular rotation speed is to be regulated.

The three-phase armature of the rotor 33 is connected to the single-phase armature of the rotor 34 through a rectifier 36.

The current intensity passing through the stator 32 of the exciter stage 30 is controlled using a low power voltage switching power supply.

Therefore, the mechanical speed of the cage 35 when it is in free rotation around the rotor 34, depends on the mechanical input speed and the field coil current. Therefore, there is a law so that it can be kept constant regardless of the input speed and/or the electrical output load.

The rotors 33 and 34 of exciter stage 30 and the induction speed regulator stage 31 are fixed to the first shaft 14 free to move between two ball bearings 41, 42.

The cage 35 is free to move concentrically with this first shaft 14 between two ball bearings 43 and 44.

The system according to the invention can operate as a generator or as a motor.

Operation as a Generator

As illustrated in FIG. 2, the input shaft 14 is mechanically driven at a variable angular velocity $\Omega s$. The stator 32 of the exciter stage 30 is powered by the source 40 of DC current Je, for which the value can be adjusted in real time. This stator 32 creates a magnetic field He with a fixed direction that is proportional to the current Je.

The three-phase armature at the rotor 33 of this exciter stage 30 is the source of a three-phase electromotive force (Faraday's law) with maximum amplitude Ee and angular velocity $\omega e$. This electromotive force is rectified in the rectifier 36 to power the rotor 34 of the speed regulator stage 31. Consequently, a DC current Jr proportional to the electromotive force Ee passes through this rotor 34. The current Jr induces a principal magnetic field Hr that turns at an angular rotation speed $\Omega s$ due to being driven by the input shaft 14.

The cage 35 is a short circuited cage similar to the cage of an induction asynchronous motor. It is free to move in rotation about the rotor 34 and meshes with the rotor of the electricity generator 10 through gears 12 and 13, and this rotor creates an opposing torque with an instantaneous value Cg dependent on the electric load.

When the cage 35 is stopped, it is the source of an electromotive force with maximum amplitude Ec and angular velocity $\omega c$ proportional to $\Omega s$ and to the number of pairs of poles p in the rotor 34. Considering the short circuit, Ec leads to induced currents Ic such that the field that they generate will attempt to oppose the cause of their development; the flux variation. Consequently, the cage 35 will rotate at an angular rotation speed $\Omega$ driving the rotor of the electricity generator 10 with it at the angular rotation velocity $\Omega G$ proportional to the gear ratio $\gamma$ of the gears 12 and 13.

The instantaneous value of the angular rotation velocity $\Omega$ is a function of three parameters: angular rotation velocity $\Omega s$, current Je and torque Cg. Consequently, regardless of the mechanical input speed and regardless of the load on the electricity generator 10, it is possible to find a value of the excitation current in the stator 32 of the exciter stage 30 such that the mechanical rotation speed of the cage 35, and therefore also the frequency, are kept constant for the electricity generator 10.

Operation as a Motor

The reversibility of the generator 10 is used in this operating mode. The multi-phase armature of the permanent magnets generator 20 associated with its rotor forms a multi-pole motor with permanent magnets (brushless motor).

If the voltage and frequency of this motor are controlled using a low power inverter, the result is an auxiliary starter that is used to start the system rotating and to accelerate it {rotor of the electricity generator 10; cage 35}; the rotor 34 of the regulator stage 31 being stopped since it is mechanically decoupled from the cage 35. When the synchronization angular velocity is reached (equivalent to 400 Hz at the stator of the electricity generator 10), the stator of the electricity generator 10 needs to be powered with network voltages at 400 Hz, and the stator of the excitation stage 21 of the electricity generator 10 is powered by a DC current to maintain rotation.

The electricity generator 10 then operates as a synchronous motor <<at no load>>, with the resisting torque being generated by the inertias alone of its own rotor and the cage 35 meshing with each other. The power supply to the permanent magnets generator can then be switched off. At this stage, the system according to the invention is ready to begin starting up a jet.

If it is assumed that the stator armature of the stator 32 of the exciter stage 30 of the induction speed regulator 11 is three-phase (it is single-phase in generator mode), and that it is powered by three-phase currents generating a field rotating in the opposite direction from the movement of the cage 35, it is possible to generate a fixed field of the rotor 34 of the induction speed regulator stage 31.

The maximum amplitude of this field increases with the frequency and intensity of the currents and also with the angular velocity of the rotor 34 of the induction speed regulator stage 31 when the jet starts to be driven. Slip can be controlled by controlling the instantaneous values of this current and frequency. Consequently, the acceleration of the jet during its start up phase is also controlled.

All that is necessary to prevent loss of synchronism of the synchronous motor is to make a real time measurement of the position of the rotor of the electricity generator 10 (permanent magnets generator frequency) with respect to the position of the stator rotating field (stator currents frequency), in real time, and adjust the excitation accordingly.

The invention claimed is:

1. A fixed frequency electrical generation system with an induction coupler, comprising:
    an electricity generator with no rings or brushes, said electricity generator comprising:
        a primary stage configured to supply electricity so that the system can be independent,
        a secondary excitation stage,
        a tertiary stage that is an electricity generation power stage, wherein said secondary excitation stage is configured to control magnetization of said tertiary stage and said primary, secondary, and tertiary stages have rotors fixed to a second mobile shaft, and
    an induction speed regulator, comprising:
        an exciter stage configured to control magnetization of an induction speed regulator stage,
        wherein said induction speed regulator stage is configured to output a fixed and regulated mechanical speed from a variable mechanical speed,
    mechanically coupled through two gears, so as to transform mechanical energy input from a first shaft rotating at a variable speed into output electricity in the form of at least one alternating voltage with a constant rms value and constant frequency.

2. A system according to claim 1, wherein the exciter stage comprises a stator powered by a DC source, for which an intensity can be regulated and a rotor configured to run at a mechanical input speed and provided with a three-phase armature.

3. A system according to claim 2, wherein the induction speed regulator stage comprises a rotor mechanically fixed to said rotor of said exciter stage, provided with a single-phase armature and a short circuit cage for which an angular rotation speed is to be regulated.

4. A system according to claim 3, wherein said rotors of the exciter stage and of the induction speed regulator stage are fixed to the first shaft.

5. A system according to claim 3, wherein the short circuit cage is free to move concentrically with the first shaft.

6. A system according to claim 5, wherein the short circuit cage is fixed to a gear that meshes with a gear fixed to a rotor of the electricity generator.

7. A system according to claim 3, wherein the three-phase armature of the rotor of the exciter stage is connected to the single-phase armature of the rotor of the induction speed regulator stage through a rectifier.

8. A system according to claim 2, wherein an intensity of a current passing through the stator of the exciter stage is controlled using a low power voltage switching power supply.

9. Use of the system according to the invention according to claim 1 on an aircraft as an electricity generator.

10. Use of the system according to the invention according to claim 1 on an aircraft as a motor.

11. An aircraft comprising the fixed frequency electrical generation system of claim 1.

* * * * *